United States Patent

Baillieul et al.

[11] Patent Number: 6,138,552
[45] Date of Patent: Oct. 31, 2000

[54] ELECTRIC DEEP FRYER AND COOKING CONTROL METHOD THEREFOR

[75] Inventors: Philippe Louis Robert Baillieul, Saint-Germain-la-Blanche-Herbe; Jacques Imbeaud, Caen, both of France

[73] Assignee: Moulinex S.A., Paris, France

[21] Appl. No.: 09/125,679

[22] PCT Filed: Feb. 17, 1997

[86] PCT No.: PCT/FR97/00294

§ 371 Date: Jun. 3, 1999

§ 102(e) Date: Jun. 3, 1999

[87] PCT Pub. No.: WO97/30618

PCT Pub. Date: Aug. 28, 1997

[30] Foreign Application Priority Data

Feb. 22, 1996 [FR] France .................................. 96 02201

[51] Int. Cl.[7] .................................................. A47J 37/12
[52] U.S. Cl. .............................. 99/331; 99/403; 99/407; 426/438
[58] Field of Search .............................. 99/331, 332, 403, 99/329 R, 328, 407; 364/571.04, 571.01, 557; 426/509, 438, 520, 523

[56] References Cited

U.S. PATENT DOCUMENTS

| 4,601,004 | 7/1986 | Holt et al. ................................ 364/557 |
| 4,913,038 | 4/1990 | Burkett et al. ............................. 99/331 |
| 5,352,866 | 10/1994 | Cartwright et al. .................. 99/403 X |
| 5,590,587 | 1/1997 | Polster ..................................... 99/403 |

FOREIGN PATENT DOCUMENTS 2 098 753  11/1982  United Kingdom .

*Primary Examiner*—Reginald L. Alexander
*Attorney, Agent, or Firm*—Young & Thompson

[57] ABSTRACT

Electric deep fat fryer comprising a vat (13) disposed in a housing (11) and containing a cooking bath (15), an electric heater (18) adapted to heat the cooking bath, a basket (20) for reception of foodstuffs to be fried, mounted in the vat (13), and a control panel (33) which provides automatic control of a cooking cycle of the foodstuffs to be fried. A cooking temperature is selected as a function of the type of particular foodstuff to be fried and is supplied to the automatic control. An image code of the quantity of the load in the basket (20) containing the foodstuffs to be fried is supplied to the automatic control (37). A cooking time for the foodstuffs to be fried is calculated as a function both of the temperature and of the quantity of foodstuff to be fried.

10 Claims, 2 Drawing Sheets

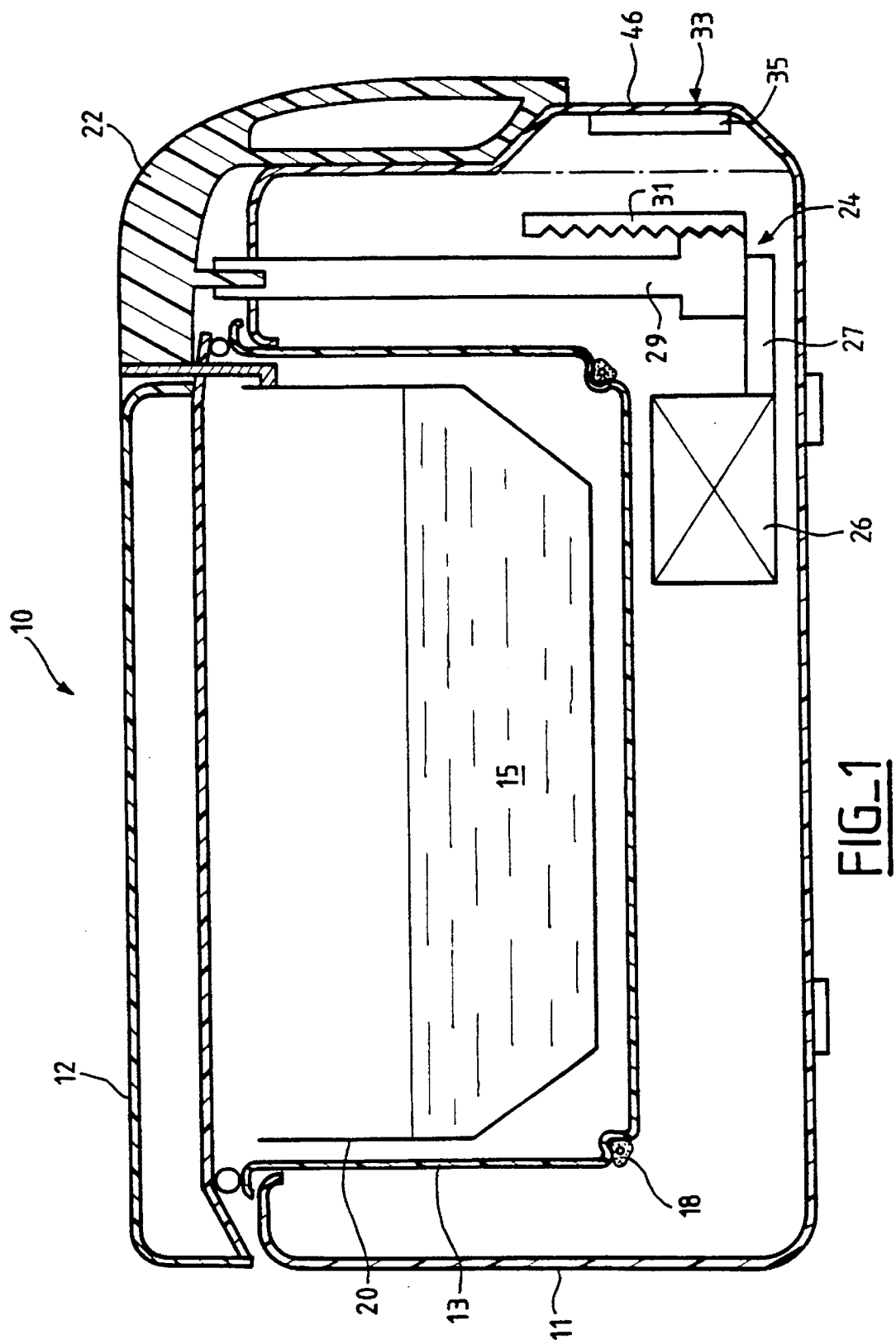
FIG_1

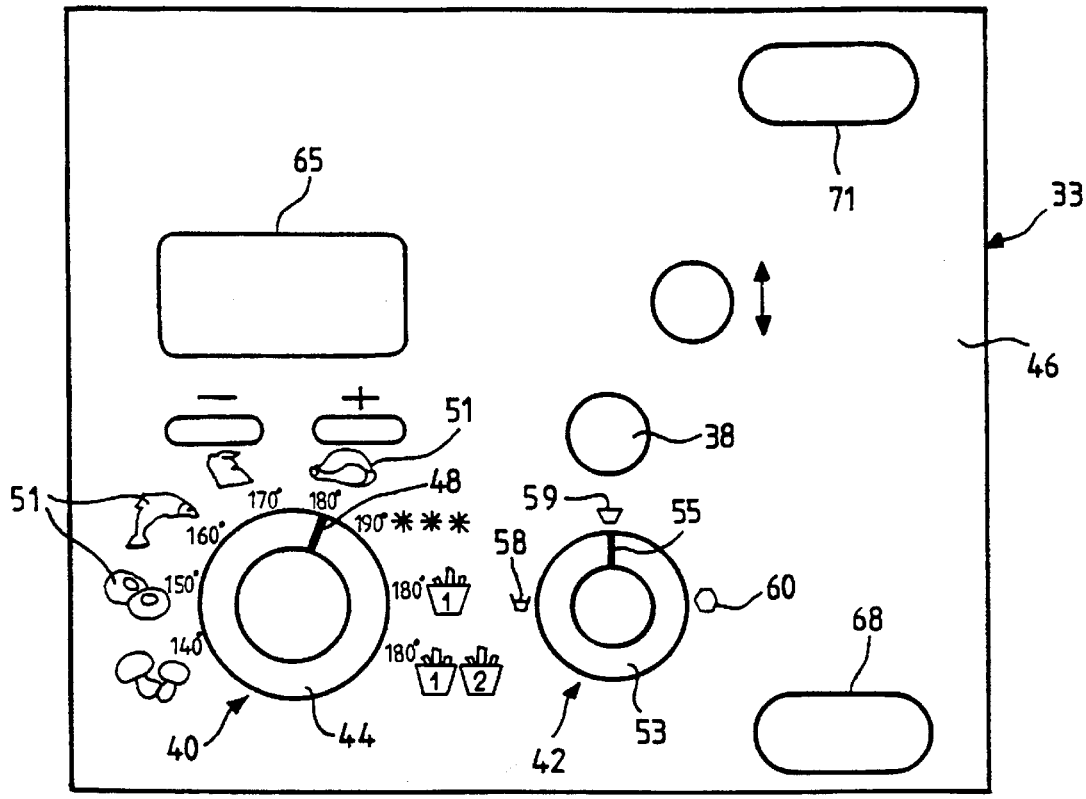
FIG_2
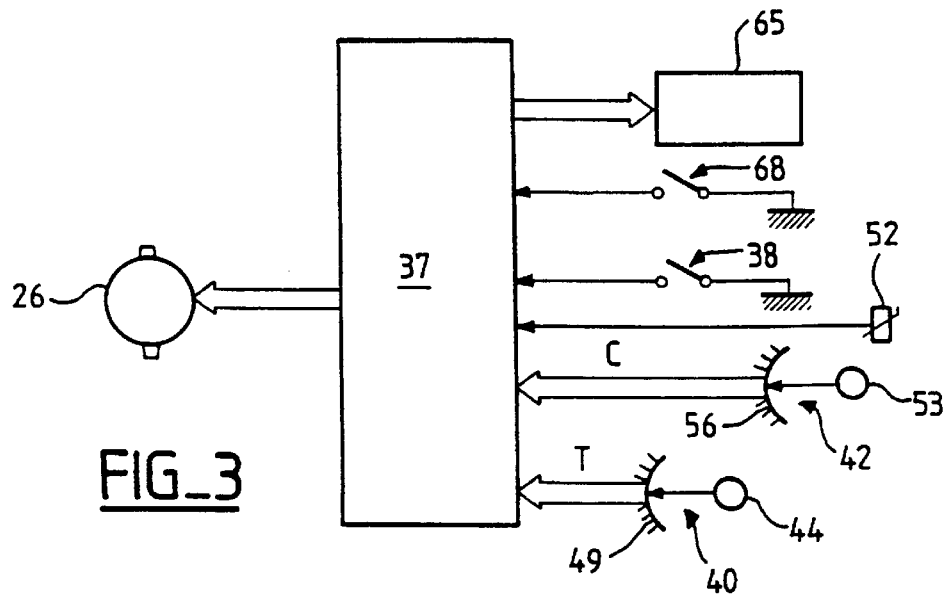
FIG_3

ELECTRIC DEEP FRYER AND COOKING CONTROL METHOD THEREFOR

FIELD OF THE INVENTION

The present invention relates to household electric deep fat fryers, particularly but not exclusively automatic fryers, comprising a vat disposed in a housing and containing a cooking bath, electric heating means adapted to heat the cooking bath, a basket for receiving the food to be fried mounted in said vat, and a control panel which comprises automatic electronic control means for a cooking cycle of the food to be fried, and first means permitting selecting a cooking temperature as a function of the particular foodstuff to be fried and providing to the automatic control means first information representative of the selected cooking temperature.

BACKGROUND OF THE INVENTION

In known automatic deep fat fryers of this type, the automatic electronic control means determine the cooking time and take account only of the appropriate cooking temperature which depends on the particular type of foodstuff to be fried, such as for example fried potatoes, mushrooms, fish, meat. However, the cooking time thus determined is not the best to obtain sufficiently cooked and browned foods, because the weight, even approximately, of the foodstuffs to be fried is not accounted for by the automatic control means of the fryer.

OBJECT OF THE INVENTION

The invention has particularly for its object to overcome this drawback and to provide an automatic deep fat fryer of the type described above, which permits determining the optimum cooking time permitting obtaining sufficiently cooked and browned foodstuffs.

SUMMARY OF THE INVENTION

According to the invention, the control panel comprises moreover second means permitting selecting an image code of the load in the basket containing the foodstuff to be fried and supplying to the automatic control means a second information representative of the selected image code of the load in the basket, and the automatic control means are adapted to calculate a cooking time for the food to be fried as a function of the first and second information emitted respectively from the first and second selection means.

Thus, it will be understood that the combination of the selection of the cooking temperature and that of the image code of the load in the basket, permits optimizing the cooking time calculated by the automatic control means. Moreover, this selection of the code constituting itself an image of its own load in the basket, and hence not requiring determining the exact weight of the foodstuff to be fried, contributes to substantially simplifying the automation of the fryer, and hence decreasing its cost of production. Moreover, the fact of visually coding the load in the basket facilitates the selection of the latter by the user and renders this selection particularly easy for the user.

According to a preferred embodiment, the second selection means comprise a selector butter provided on the face of the control panel and adapted to occupy selectively several positions each marked by a particular identification symbol constituting the image code of the load in the basket. Preferably, the identification symbols are three in number and correspond respectively to a half load in the basket, a normal load in the basket and an overload in the basket.

The invention also relates to a process for controlling the cooking of an electric deep fat fryer according to the invention, this process being characterized in that it comprises the following operations:

- selection of a cooking temperature corresponding to a particular type of foodstuff to be fried;
- selection of an image code of the load in the basket;
- calculation with the aid of automatic control means of a cooking time as a function of the selected cooking temperature and of the selected image code of the load in the basket;
- displaying the calculated cooking time;
- and starting an automatic cooking cycle by means of a control member which actuates the automatic control means as soon as the selected cooking temperature is reached by the cooking bath.

BRIEF DESCRIPTION OF THE DRAWINGS

The characteristics and advantages of the invention will become further apparent from the description which follows, as a non-limiting example, with reference to the accompanying drawings, in which:

FIG. 1 is a schematic view in vertical cross section of a deep fat fryer according to the invention;

FIG. 2 is an enlarged front view of a control panel on the fryer of FIG. 1; and

FIG. 3 is a schematic representation of the different constituents of the automation of the fryer of FIG. 1.

In what follows, the electric deep fat fryer according to the invention will be described in the framework of a fryer operating entirely automatically, it being understood that the invention is equally applicable to a conventional electrical fryer.

DETAILED DESCRIPTION OF THE INVENTION

In the embodiment shown schematically in FIG. 1, the automatic deep fat fryer 10 for household use comprises, in a housing 11 provided with a closure cover 12, a vat 13 containing the cooking bath 15 constituted either by oil or by grease from melting a block of grease, electrical heating means constituted in this instance by a shielded tubular resistance 18 fixed on the bottom of the vat 13 and adapted to heat the cooking bath, and a perforated basket 20 for reception of the foodstuffs to be fried (not shown) which is provided with a handle 22 and which is movably mounted in the vat between two positions, either a lowered position (FIG. 1) in which the basket is immersed in the cooking bath, or a raised position in which the basket is maintained above the cooking bath. The passage of the basket 20 between the two positions takes place thanks to electromechanical means 24 for lowering and raising which are arranged in the housing 11 and which comprise, in this embodiment of FIG. 1, a synchronous motor 26 provided with a reducer 27 which actuates a member forming a lifter 29 coming into engagement with the handle 22 and movable vertically between the side walls of the vat and the housing by means of a rack 31.

The deep fat fryer 10, FIG. 1, comprises moreover on the front surface of the housing 11 a control panel 33, better seen in FIG. 2, containing a printed circuit plate shown schematically at 35 in FIG. 1 and which comprises automatic electronic control means constituted by a microcontroller 37 (see FIG. 3), for example of the 47C222 type sold by TOSHIBA, adapted to start, in response to actuation of a button forming switch 38 arranged on the front of the control panel (see FIGS. 2 and 3), an automatic cooking cycle for the food by controlling the electrical supply of the electromechanical means 24 for lowering and raising the basket 20.

The control panel 33 comprises first selection means 40 serving as a thermostat, which are adapted to regulate the cooking bath temperature as a function of the type of particular foodstuff to be fried, and whose operating temperature is comprised between 140° C. and 190° C. These selection means 40, which will be described in detail hereafter, supply to the microcontroller 37 a first information, indicated at T in FIG. 3, which is representative of the selected cooking temperature.

According to the invention, the control panel 33 moreover comprises second means 42 permitting selecting an image code of the load in the basket 20 containing the foodstuff to be fried and supplying to the microcontroller 37 a second information, denoted C in FIG. 3, representative of the load in the basket, and the microcontroller 37 is adapted to calculate a cooking time considered as ideal for good frying and determined as a function of the two informations T and C emitted respectively by the two selection means 40 and 42.

Concerning FIGS. 2 and 3, in this embodiment, the selection means 40 for the cooking temperature comprise a selector button 44 mounted rotatably on the front surface 46 of the control panel 33 (FIG. 2), provided with a graduated index 48 and connected to a potentiometer 49 which is arranged on the printed circuit plate 35 (FIG. 1) and which is connected to the microcontroller 37 to transmit to it the information T representative of the temperature of the cooking as a function of the particular type of foodstuff to be fried. As shown in FIG. 2, the selector button 44 is adapted to occupy selectively several positions marked respectively by the symbols 51 for identification of the different foodstuffs, such as mushrooms, doughnuts, fish, french fries, etc., each of these symbols 51 being associated with the marking of a temperature value for cooking suitable for the selected foodstuff, as shown in FIG. 2.

Preferably, the value of the temperature of cooking is regulated for example by means of a thermosensitive probe of the CNT ("coefficient of negative temperature") type, indicated at 52 in FIG. 3, which is immersed in the cooking bath 15 of the fryer.

In this example, FIGS. 2 and 3, the selection means 42 of the image code of the load in the basket 20 comprise a selector button 53 also mounted rotatably on the front surface 46 of the control panel 33 (FIG. 2), provided with a graduated index 55 and connected to a potentiometer 56 which is arranged on the printed circuit plate 35 (FIG. 1) and which is connected to the microcontroller 37 to transmit to it information C representative of the load in the basket. As to FIG. 2, the selector button 53 is adapted to occupy selectively several positions, in this instance three positions, each marked by a particular identification symbol 58; 59; 60 constituting the image code of the load in the basket and corresponding either to a half load in the basket, or a normal load in the basket, or an overload in the basket.

This embodiment of selector means 42 of the image code of the load in the basket is particularly simple and permits the user rapidly to visualize the load in the basket of foodstuff which he desires to fry, without needing to know the exact weight of the foodstuff to be fried. This simple visualization of the load in the basket by the user hence gives rise to great ease of use.

In an unillustrated modification, the selector means 42 comprise a detector of the load in the basket adapted to transmit to the microcontroller 37 a signal representative of the ranges of weights corresponding to the image codes of the load in the basket.

It will be noted that the microcontroller 37 can comprise pre-programming means (not shown) for the panel indicating the temperature and the cooking time as a function of the load in the basket.

As to FIGS. 2 and 3, the front surface 46 of the control panel 33 comprises visualization means 65 connected to the microcontroller 37 and adapted to display the optimum cooking temperature calculated by the microcontroller as a function of the two standard informations T and C representing respectively the selected cooking temperature and the selected image code for the load in the basket.

In FIGS. 2 and 3, there is shown at 68 a start/stop switch button for the fryer, and in FIG. 2 there is shown at 71 an oil/grease selector switch button.

There will now be explained the automatic operation of the fryer described above by way of the cooking control process according to the invention, supposing for example that the selector switch 71 is in the "oil" position. Moreover, it will be considered that the user desires to fry a cut-up chicken such as constitutes a normal load in the basket.

The user selects the cooking temperature corresponding to chicken, and to do this, turns the button 44 by placing the index 48 of the latter opposite the symbol 51 representing chicken and associated with the cooking temperature suitable for chicken, in this instance 180° C. as shown in FIG. 2. Similarly, the user selects the image code for the normal load in the basket, and to do this, turns the button 53 placing the index 55 of the latter opposite the symbol 59 identifying the normal load in the basket, as shown in FIG. 2.

After turning on the fryer by means of the switch button 68, the resistance 18 (FIG. 1) heats up and automatic starting the cycle is controlled by pressing on the button 38. During this actuation of the fryer, the microcontroller 37 controls the electrical supply circuit of the motor 26 which causes, via the member forming a lift 29, the rising of the basket 20 to its raised position. The microcontroller 37 computes the cooking time as a function of the two standard information emitted respectively from the two potentiometers 49 and 56, of which one, T, is representative of the selected cooking temperature, in this case 180° C., and of which the other, C, is representative of the selected image code 59 for the normal load in the basket. In this example (basket normally loaded with chicken parts), the cooking time calculated and considered as ideal for a good product is 7 minutes and is displayed on the display 65.

It will be noted that the cooking time calculated by the microcontroller 37 can also be inscribed on the display 65 as soon as the fryer is started.

As soon as the selected cooking temperature (180° C.) is reached by the cooking bath 15 and is validated by the CNT regulation probe 52, the microcontroller 37 starts the automatic cooking cycle in the course of which the basket 20 is immersed in the cooking bath under the control of the motor 26.

At the end of the cycle, in this case after 7 minutes, the microcontroller 37 controls the electric supply of the motor 26 such that it causes the rising of the basket 20 to its raised position.

For certain foodstuffs, such as in particular french fries, the cooking can be effected as is well known in two immersions of the basket in the cooking bath 15, the second immersion taking place automatically after the first immersion of the basket.

Moreover, it will be noted that safety means (not shown) are provided to prevent any modification of the calculated cooking time in the case in which, during automatic operation of the fryer, the user inadvertently turns one and/or the other of the two selection buttons 44 and 53 (FIG. 2).

It will further be noted that in the case of an electric deep fat fryer with automatic cooking according to the invention, but operating manually, the electromechanical means 24 for lowering and raising the basket controlled by the microcontroller 37 are omitted, a lowered position detector for the basket being then provided automatically to start the cooking cycle.

What is claimed is:

1. Electric deep fat fryer comprising a vat (13) disposed in a housing (11) and containing a cooking bath (15), electric heating means (18) adapted to heat the cooking bath, a basket (20) for reception of foodstuffs to be fried mounted in said vat (13), and a control panel (33) which comprises electronic means (37) for automatic control of a cooking cycle of the foodstuffs to be fried, and first means (40) permitting selecting a cooking temperature as a function of the type of particular foodstuff to be fried and supplying to the automatic control means (37) a first information (T) representative of the selected cooking temperature, characterized in that the control panel (33) moreover comprises second means (42) permitting selecting an image code of the quantity of the load in the basket (20) containing the foodstuffs to be fried and supplying to the automatic control means (37) a second information (C) representative of the selected image code for the quantity of the load in the basket, and automatic control means (37) are adapted to calculate a cooking time for the foodstuffs to be fried as a function of the first (T) and second (C) information emitted respectively by the first (40) and second (42) selection means.

2. Electric deep fat fryer according to claim 1, characterized in that the second selection means (42) comprise a selector button (53) provided on the front of the control panel (33) and adapted to occupy selectively several positions each marked by a particular identification symbol (58; 59; 60) constituting the image code of the quantity of the load in the basket (20).

3. Electric deep fat fryer according to claim 2, characterized in that the identification symbols (58, 59, 60) are three in number and correspond respectively to a half load in the basket, a normal load in the basket and an overload in the basket.

4. Electric deep fat fryer according to claim 1, characterized in that the second selection means (42) comprise a detector of the quantity of the load in the basket (20) adapted to transmit to the automatic control means (37) a signal representative of the ranges of weights corresponding to the image codes of the load in the basket.

5. Electric deep fat fryer according to claim 1, characterized in that the first selection means (40) comprise another selector button (44) provided in the front of the control panel (33) and adapted to occupy selectively several positions marked respectively by symbols (51) for identifying the different foodstuffs, each of these symbols (51) being associated with a mark of a temperature value of cooking suitable for the foodstuff in question.

6. Electric deep fat fryer according to claim 1, characterized in that the control panel (33) represents on its face visualization means (65) connected to the automatic control means (37) and displaying the calculated cooking time.

7. Electric deep fat fryer according to claim 1, in which the basket (20) for reception of the foodstuffs to be fried is movably mounted in the vat (13) and is adapted to occupy, thanks to electromechanical means (24) for lowering and raising the basket (20), either a raised position in which this basket is maintained above the cooking bath (15), or a lowered position in which this basket is immersed in the cooking bath (15), characterized in that the automatic control means (37) are adapted to control the electrical supply of the electromechanical means (24) for lowering and raising the basket (20).

8. Electric deep fat fryer according to claim 2, characterized in that the automatic control means comprise a microcontroller (37), and each selector button (44; 53) is connected to a potentiometer (49; 56) connected to the microcontroller (37).

9. Process for the cooking control of an electric deep fat fryer according to claim 1, characterized in that it comprises the following operations:

selection of a cooking temperature corresponding to a particular type of foodstuff to be fried;

selection of an image code of the quantity of the load in the basket;

calculating with the help of the automatic control means (37) a cooking time as a function of the selected cooking temperature and of the selected image code for the quantity of the load in the basket;

displaying the calculated cooking time;

and starting an automatic cooking cycle by means of a control member (38) which actuates the automatic control means (37) as soon as the selected cooking temperature is reached by the cooking bath (15).

10. Process for controlling cooking according to claim 9, characterized in that the calculated cooking time is displayed as soon as the heating means are actuated (18).

* * * * *